United States Patent
Yokozeki

(10) Patent No.: US 9,742,985 B2
(45) Date of Patent: Aug. 22, 2017

(54) AUTOMATIC FOCUS ADJUSTMENT APPARATUS AND CONTROL METHOD THEREFOR

(71) Applicant: CANON KABUSHIKI KAISHA, Tokyo (JP)

(72) Inventor: Makoto Yokozeki, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 15/069,592

(22) Filed: Mar. 14, 2016

(65) Prior Publication Data
US 2016/0277668 A1    Sep. 22, 2016

(30) Foreign Application Priority Data
Mar. 19, 2015 (JP) ................. 2015-056427

(51) Int. Cl.
| H04N 5/225 | (2006.01) |
| H04N 5/232 | (2006.01) |
| G02B 7/34 | (2006.01) |
| G02B 7/38 | (2006.01) |
| G02B 7/28 | (2006.01) |

(52) U.S. Cl.
CPC ......... *H04N 5/23212* (2013.01); *G02B 7/285* (2013.01); *G02B 7/34* (2013.01); *G02B 7/38* (2013.01)

(58) Field of Classification Search
None
See application file for complete search history.

(56) References Cited

FOREIGN PATENT DOCUMENTS

JP          2013-254166 A    12/2013

*Primary Examiner* — Stephen Coleman
(74) *Attorney, Agent, or Firm* — Canon USA Inc., IP Division

(57) ABSTRACT

In an automatic focus adjustment apparatus, a setting unit sets, on an image sensor, a first range in which defocus information is detected using a phase difference detection and a second range in which a focus state is detected using a contrast detection. The second range is set so as to include the first range. In a case where the second range is detected by the contrast detection as being in an in-focus state, a control unit changes a control mode into a predetermined control mode in which the driving of the focus lens is limited according to the defocus information in the first range detected by the phase difference detection.

23 Claims, 15 Drawing Sheets

FIG. 2A

| R | Gr | R | Gr | R | Gr | R | Gr | R | Gr |
|---|----|---|----|---|----|---|----|---|----|
| Gb | B | Gb | B | Gb | B | Gb | B | Gb | B |

FIG. 2B

| R A | R B | Gr A | Gr B | R A | R B | Gr A | Gr B | R A | R B | Gr A | Gr B | R A | R B | Gr A | Gr B | R A | R B | Gr A | Gr B |
|-----|-----|------|------|-----|-----|------|------|-----|-----|------|------|-----|-----|------|------|-----|-----|------|------|
| Gb A | Gb B | B A | B B | Gb A | Gb B | B A | B B | Gb A | Gb B | B A | B B | Gb A | Gb B | B A | B B | Gb A | Gb B | B A | B B |

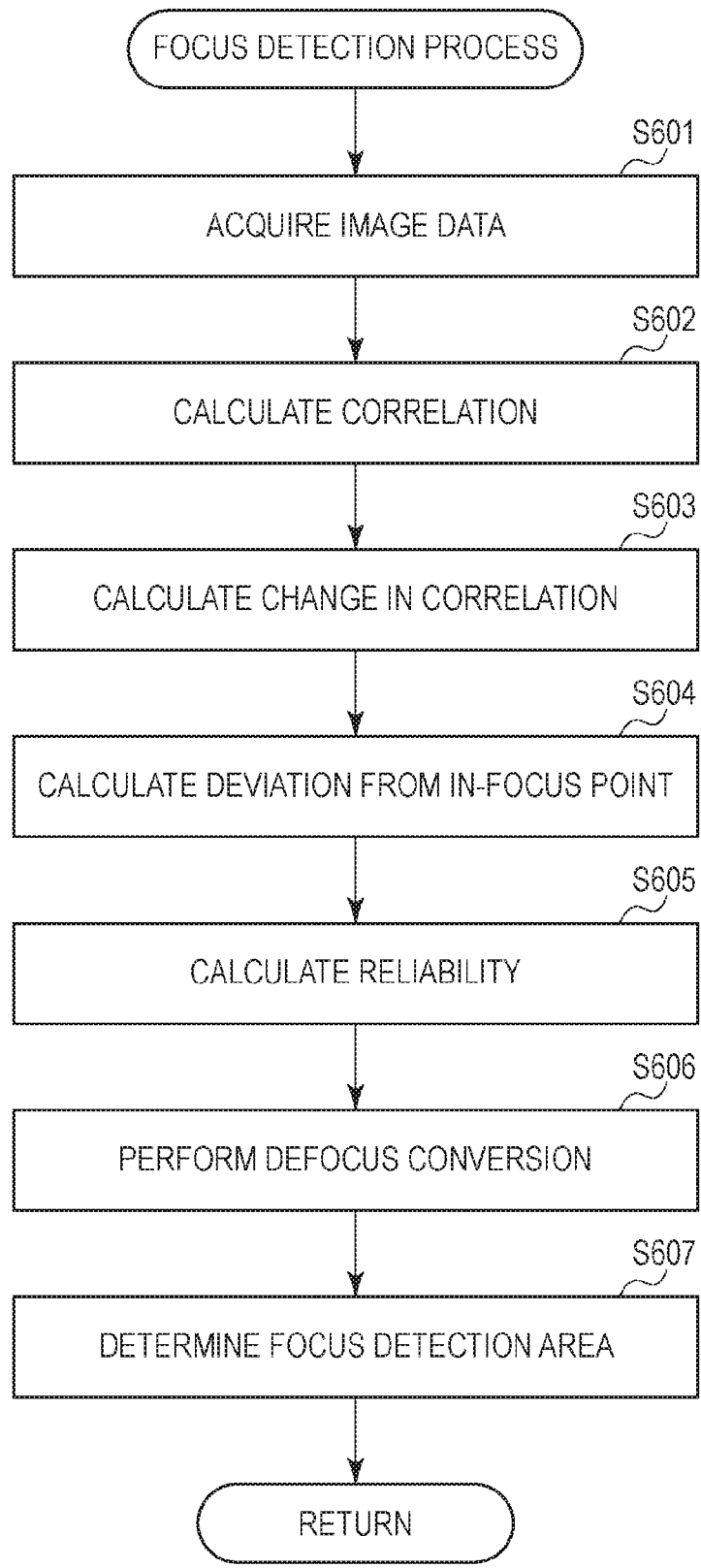

FIG. 12

| JUDGEMENT FRAME | | PHASE DIFFERENCE AF FRAME | | |
|---|---|---|---|---|
| | | DEFOCUS < TH1 | | |
| | | IN THE SAME DIRECTION AS PREVIOUS DEFOCUS DIRECTION | IN OPPOSITE DIRECTION TO PREVIOUS DEFOCUS DIRECTION | TH1 ≤ DEFOCUS ≤ TH2 | TH2 < DEFOCUS |
| IN FOCUS | [1] NORMAL AF CONTROL | [2] FIRST LIMITED AF CONTROL (PREVENT FLUCTUATION) | [4] NORMAL AF CONTROL | [3] SECOND LIMITED AF CONTROL (HANDLE CROSSING PROBLEM) |
| OUT OF FOCUS | [5] NORMAL AF CONTROL | | | |

FIG. 15

| SECOND JUDGEMENT FRAME | FIRST JUDGEMENT FRAME | PHASE DIFFERENT AF FRAME | | | | |
|---|---|---|---|---|---|---|
| | | DEFOCUS ≤ TH3 | TH3 < DEFOCUS < TH1 | TH3 < DEFOCUS < TH1 | TH1 ≤ DEFOCUS ≤ TH2 | TH2 < DEFOCUS |
| | | IN SAME DIRECTION AS PREVIOUS DEFOCUS DIRECTION | | IN OPPOSITE DIRECTION TO PREVIOUS DEFOCUS DIRECTION | | |
| IN FOCUS | — | [5] NORMAL AF CONTROL | | [6] FIRST LIMITED AF CONTROL (PREVENT FLUCTUATION) | [7] SECOND LIMITED AF CONTROL (HANDLE CROSSING PROBLEM) | |
| OUT OF FOCUS | IN FOCUS | | [1] NORMAL AF CONTROL | [2] FIRST LIMITED AF CONTROL (PREVENT FLUCTUATION) | [4] NORMAL AF CONTROL | [3] SECOND LIMITED AF CONTROL (HANDLE CROSSING PROBLEM) |
| | OUT OF FOCUS | [5] NORMAL AF CONTROL | | | | |

AUTOMATIC FOCUS ADJUSTMENT APPARATUS AND CONTROL METHOD THEREFOR

BACKGROUND OF THE INVENTION

Field of the Invention

The present disclosure relates to an automatic focus (AF) adjustment apparatus and an AF method using phase difference detection and contrast detection, and a photographing apparatus including the AF adjustment apparatus.

Description of the Related Art

One known method to detect a focus in an image pickup apparatus is to detect contrast (hereinafter this method is referred to as contrast autofocus (AF)). Another known method is to detect a focus by detecting a phase different (hereinafter referred to as phase difference AF). The contrast AF is employed in many video cameras and digital still cameras in which an image sensor is used also as a focus detection sensor.

In the contrast AF, an output signal from the image sensor and, more particularly, information on contrast in high frequency components is used to detect a focus lens position at which an AF evaluation value given by contrast information has a maxim value and determine this focus lens position as an in-focus position. In the contrast AF using the above-described scheme, to determine the position of the focus lens and the movement direction of the focus lens to focus on an object where best focus is achieved on an object, it is necessary to acquire contrast information while moving the focus lens. Thus, it may take a long time to achieve an in-focus state, or there is a possibility that the focus lens may be moved into a wrong direction, or the focus lens may be moved further beyond an in-focus position, or other low-quality behaviors may occur.

On the other hand, in the phase difference AF, an amount of defocus is detected from a difference (a difference in relative position in a pupil division direction) between two image signals obtained by sensing light fluxes passing through different exit pupil areas in an image pickup optical system. Therefore, when a charge accumulation operation is performed once, the amount and the direction of the deviation of focus are obtained at the same time, which allows it to achieve a high-speed focus adjustment operation. In particular, when an image sensing plane phase difference detection method (image sensing plane phase difference AF), in which the phase difference detection is accomplished in an image sensing plane, is employed, it is possible to achieve high-speed and high-quality AF even in a LV (live view) image capture mode or a movie capture mode.

However, in the phase difference AF, various factors may cause a reduction in focus detection accuracy. To handle this situation, it has been proposed to use hybrid AF that allows it to obtain advantages of both contrast AF and phase difference AF. Japanese Patent Laid-Open No. 2013-254166 discloses a focus adjustment technique in which the focus detection method is switched between the phase difference AF and the contrast AF based on object information extracted from a contrast AF signal.

However, in the technique disclosed in Japanese Patent Laid-Open No. 2013-254166, even when the phase difference AF is selected based on the contrast AF signal, a result of the focus detection of the phase difference AF may include an error caused by various factors. Examples of such factors include a change in an image pattern of an object, a change in a range in which an object is captured, which may occur when the object moves, and the like. When the result of the focus detection by the phase difference AF includes an error, if a high-speed focus adjustment operation is performed, there is a possibility that a fluctuation in focus occurs, that is, an in-focus state and a slight deviation from an in-focus point may alternately occur. On the other hand, in a situation in which an object crosses an area in which a main object is captured, if a high-speed focus adjustment operation is performed, there is a possibility that it is tried to achieve an in-focus state for a non-intended object, which may cause a fluctuation in focus.

SUMMARY OF THE INVENTION

The present disclosure provides a technique to, in focus adjustment using the phase difference detection, achieve high-quality focusing even when a change occurs in condition of an object or an image capturing condition.

In view of the above, an aspect of the present disclosure provides an automatic focus adjustment apparatus including an image sensor configured to generate an image signal by performing a photoelectric conversion on a light flux incident via an image pickup optical system including a focus lens, a first focus detection unit configured to detect defocus information by a phase difference detection, a second focus detection unit configured to detect a focus state based on the image signal, a setting unit configured to set a first range on the image sensor in which the first focus detection unit detects the defocus information and a second range on the image sensor in which the second focus detection unit detects the focus state, and a control unit configured to control driving the focus lens based on the defocus information detected by the first focus detection unit, wherein the setting unit sets the second range such that the second range includes the first range, and wherein in a case where the focus state in the second range detected by the second focus detection unit is in an in-focus state, the control unit changes a control mode into a predetermined control mode in which the control unit limits the driving of the focus lens according to the defocus information in the first range detected by the first focus detection unit.

Further features of the present invention will become apparent from the following description of exemplary embodiments with reference to the attached drawings.

BRIEF DESCRIPTION OF THE DRAWINGS

FIGS. 2A and 2B are diagrams each illustrating a pixel configuration for image sensing plane phase difference detection according to an embodiment.

FIG. 6 is a flow chart illustrating a phase difference focus detection process according to an embodiment.

FIG. 12 is a diagram illustrating a condition of an AF control method determination process according to the first embodiment.

FIG. 15 is a diagram illustrating a condition of an AF control method determination process according to the second embodiment.

DESCRIPTION OF THE EMBODIMENTS

Embodiments of the present disclosure are described in detail below with reference to accompanying drawings. Note that the embodiments described below are merely examples of implementations of the present disclosure, and the present disclosure is not limited to the embodiments described below.

First Embodiment

Figure 1:
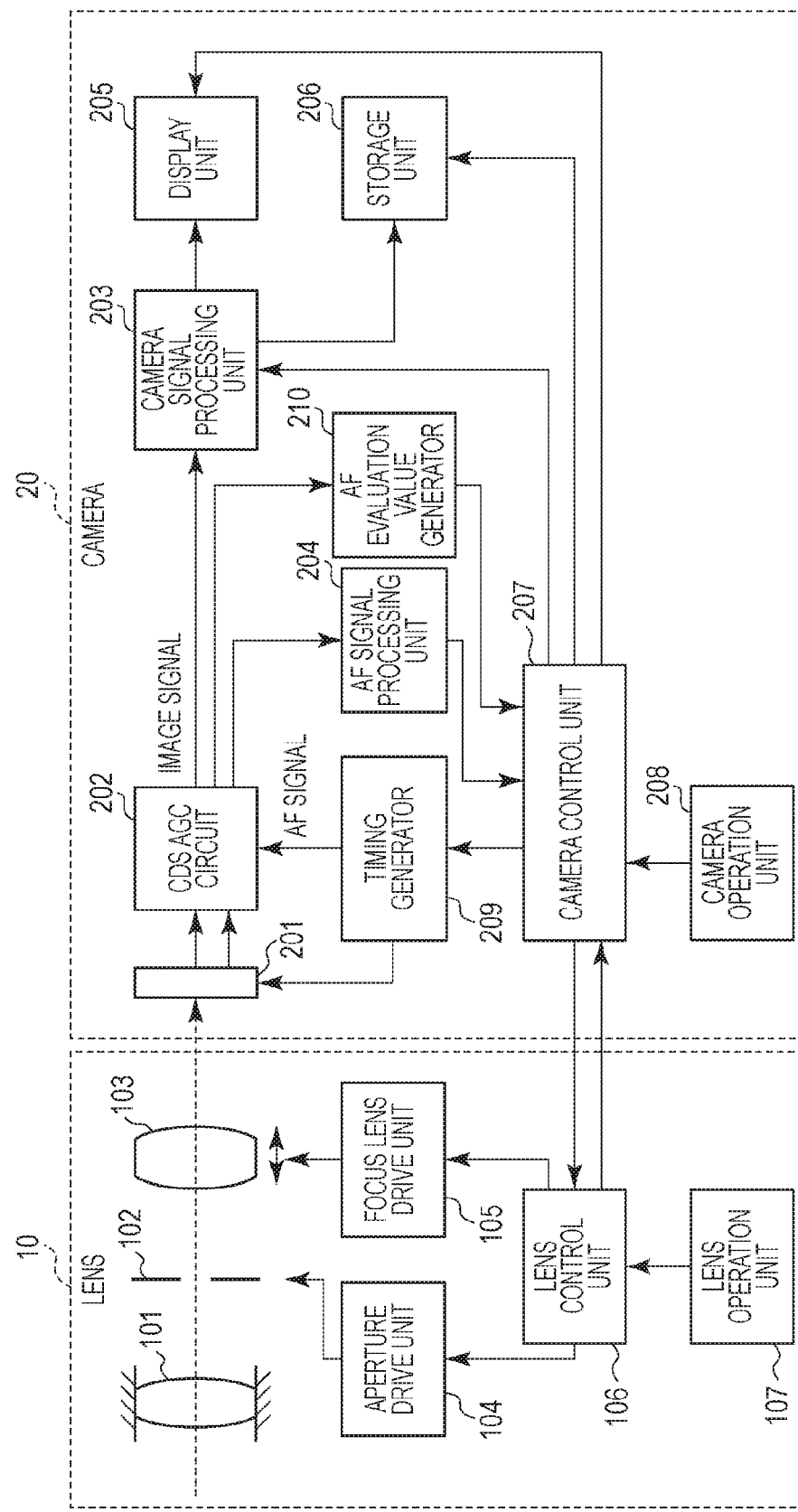
FIG. 1 is a block diagram illustrating a configuration of a camera and a lens unit according to an embodiment.

FIG. 1 is a block diagram illustrating a configuration of a lens-interchangeable camera including a lens unit and a main part of a camera according to an embodiment. As illustrated in FIG. 1, the camera system according to the present embodiment includes a lens unit 10 and a main camera body 20. Data is transmitted between a lens controller 106, which controls the overall operation of the lens unit 10, and a camera control unit 207 which controls the overall operation of the camera. Note that although the present embodiment is described below for a case in which the camera is of a lens-interchangeable type, the camera may be of a lens-body integrated type.

First, a configuration of the lens unit 10 is described. The lens unit 10 has an image pickup optical system including a fixed lens 101, an aperture 102, a focus lens 103, and a zoom lens (not shown). The aperture 102 is driven by an aperture drive unit 104 so as to control an amount of light incident on an image sensor 201 described below. The focus lens 103 is driven by a focus lens drive unit 105 to perform a focus adjustment. The zoom lens (not illustrated) is driven by a zoom lens drive unit to perform a zoom adjustment. It should be noted that in the present embodiment the zoom lens and the zoom lens drive unit are optional because the camera system according to the present embodiment can include AF adjustment without having a zoom lens.

The aperture drive unit 104, the focus lens drive unit 105, and the zoom lens drive unit are driven by the lens controller 106 to determine the open ratio of the aperture 102 and the positions of the focus lens 103 and the zoom lens. In a case where an operation of controlling the focus or the zoom is performed by a user via the lens operation unit 107, the lens controller 106 performs a control according to the operation performed by the user.

The lens controller 106 (lens control unit) controls the aperture drive unit 104, the focus lens drive unit 105, and the zoom lens drive unit (not shown) according to a control command or control information received from the camera control unit 207 as described below. Furthermore, the lens controller 106 transmits lens information (information in terms of, for example, the image pickup optical system) to the camera control unit 207.

Next, the configuration of the main camera body 20 having the automatic focus adjustment apparatus according to the present embodiment is described below. The main camera body 20 is configured to be capable of obtaining an image signal from a light flux passing through the image pickup optical system of the lens unit 10. The image sensor 201 is realized using a CCD or a CMOS sensor. After being passed through the image pickup optical system, the light flux is focused onto a photo-sensing surface of the image sensor 201, and a resultant object image formed thereon is converted (via a photoelectric conversion) by photodiodes into electric charges corresponding to an amount of incident light. The electric charges stored in the respective photodiodes are sequentially read out, in the form of a voltage signal corresponding to the electric charges, from the image sensor 201 in response to driving pulses given from a timing generator 209 under the control of the camera control unit 207.

In a case where an image sensor employed does not support the focus adjustment using the image sensing plane phase difference detection method (hereinafter referred to as the image sensing plane phase difference AF), pixels are arranged, for example, in a Bayer pattern such as that illustrated in FIG. 2A. In contrast, in the image sensor 201 according to the present embodiment, to make it possible to perform the image sensing plane phase difference AF, a plurality of (two in the present example) photodiodes are disposed in each pixel as illustrated in FIG. 2B. A light flux is split via a microlens and is focused onto the two photodiodes thereby obtaining two signals, that is, a signal for image capture and a signal for AF. Note that the image signal from each pixel is obtained by adding together the signals output from the two photodiodes, while two image signals for AF are obtained from the signals (A, B) output from the respective photodiodes. The method of obtaining the two image signals is not limit to the method of reading out the two respective image signals. For example, taking into account the processing load, an added signal (A+B) and one of the two image signals (for example, A) may be read out, and the other image signal (for example, B) may be obtained by subtracting the first one of the image signals from the added signal (A+B). An AF signal processing unit 204 (described below) calculates a correlation between the two AF image signals to determine an amount of image difference or various kinds of reliability information.

In the present embodiment, each pixel is configured, by way of example, to include two photodiodes. However, the number of photodiodes is not limited to two, but each pixel may include three or more photodiodes. Furthermore, in the present embodiment, the configuration of the image sensor supporting the image sensing plane phase difference AF is not limited to the above-described configuration in which each pixel includes a plurality of photodiodes, but instead the image sensor may include separate pixels specifically dedicated for use in focus detection.

The image signal and the AF signal read out from the image sensor 201 are input to a correlated double sampling (CDS)/automatic gain control (AGC) CDS/AGC converter 202, which in turn performs correlated double sampling to remove reset noise, gain adjustment, and signal digitization. The CDS/AGC converter 202 outputs the image signal to a camera signal processing unit 203 and an AF evaluation value generator 210, and outputs the signal for image sensing plane phase difference AF to the AF signal processing unit 204.

The camera signal processing unit 203 transmits the image signal output from the CDS/AGC converter 202 to the display unit 205. The display unit 205 is a display device realized using a liquid crystal display (LCD), an organic electroluminescent (EL) display, or the like, and is configured to display an image based on the image signal. In a mode in which an image signal is stored, the image signal is stored in the storage unit 206 such as a memory card.

The AF signal processing unit 204 performs a correlation calculation based on two AF image signals output from the CDS/AGC converter 202, and calculates an amount of image difference and reliability information (degree of coincidence between two images, two image sharpness, contrast information, saturation information, defect information, and/or the like). The AF signal processing unit 204 outputs the calculated amount of image difference and reliability information to the camera control unit 207. Details of the correlation calculation will be described later with reference to FIGS. 7A to 7C and FIGS. 8A to 8D.

The AF evaluation value generator 210 extracts predetermined frequency components from the image signal, generates an AF evaluation value therefrom, and outputs the generated AF evaluation value to the camera control unit 207. The AF evaluation value represents a degree of sharpness (degree of contrast) of an image generated based on the output signal provided from the image sensor 201. The degree of sharpness changes depending on a focus state (degree of focus) of the image pickup optical system, and thus the AF evaluation value is also a signal representing the focus state of the image pickup optical system.

The camera control unit 207 transmits and receives information to and from various parts of the main camera body 20 thereby controlling the various parts of the main camera body 20. In addition to controlling a process performed in the main camera body 20, the camera control unit 207 also executes a camera function according to an input given by a user by operating the camera operation unit 208, such as turning on/off of power, changing of settings, starting of a storage operation, starting of an AF control operation, checking of a stored image, selecting of an AF frame, or the like. Furthermore, as described above, the camera control unit 207 transmits and receives information to and from the lens controller 106 in the lens unit 10 to transmit a control command/control information to control the image pickup optical system and to receive information associated with an operating status of the lens unit.

Overall AF Process

Next, a sequence of an AF process performed by the camera control unit 207 is described below with reference to FIG. 3. The process in steps S301 to S304 described below is executed periodically according to a camera operation repetition period.

First, in step S301, the camera control unit 207 sets an area in which a correlation is performed by the AF signal processing unit 204 (hereinafter this area will be referred to as a phase difference AF frame). Furthermore, the camera control unit 207 sets an area in which a contrast evaluation value is calculated by the AF evaluation value generator 210 (hereinafter this area will be referred to as a contrast focus detection frame). A method of setting the area in which the correlation is calculated and a method of setting the area in which the contrast evaluation value is calculated will be described in further detail below with reference to FIG. 4A to 4C and FIG. 5. Thereafter, the processing flow proceeds to step S302.

Next, in step S302, a focus detection process is performed in each area set in step S301, and thereafter the processing flow proceeds to step S303. In the focus detection process performed by the AF signal processing unit 204, an amount of defocus is calculated, and in the focus detection process performed by the AF evaluation value generator 210, an AF evaluation value is calculated. The amount-of-defocus calculation process and the AF evaluation value calculation process will be described later with reference to FIGS. 6 to 9.

Next, in step S303, the camera control unit 207 performs an AF control method determination process and thereafter the processing flow proceeds to step S304. The AF control method determination process according to the present embodiment will be described in detail later with reference to FIG. 10.

Next, in step S304, based on the amount of defocus calculated in step S302 and the AF control method determined in step S303, the camera control unit 207 transmits a command to the lens controller 106 to drive the focus lens 103. Thereafter, the AF process is ended.

Phase Difference AF Frame Setting Process

Next, the process of setting the phase difference AF frame in step S301 is described in further detail below with reference to FIGS. 4A to 4C.

Figure 4A:
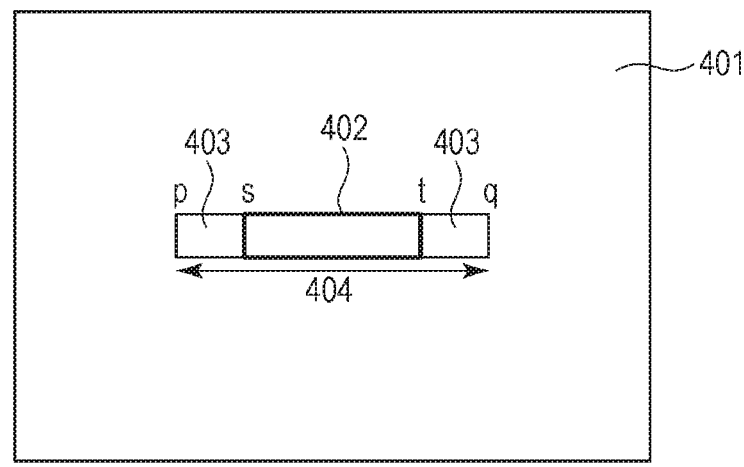
FIGS. 4A to 4C are diagrams each illustrating a focus detection area according to an embodiment.
Figure 4B:
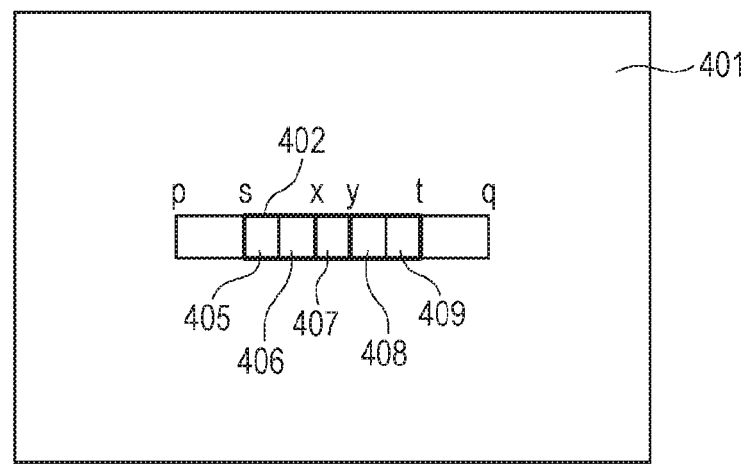
Figure 4C:
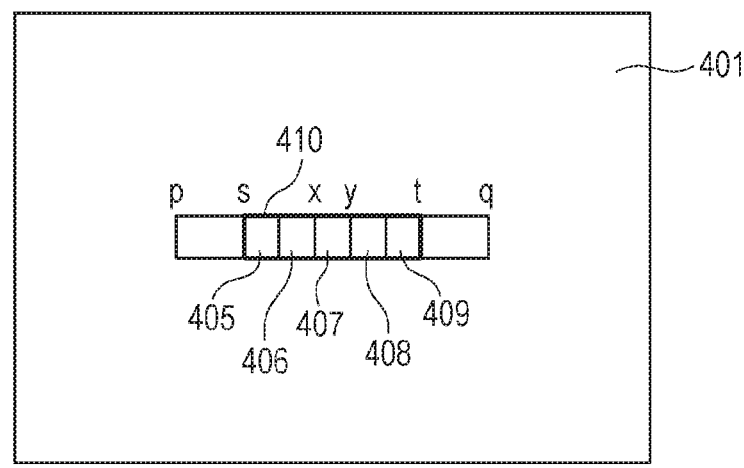

FIGS. 4A to 4C are diagrams illustrating examples of areas in which an image signal used in the phase difference AF is acquired. FIG. 4A is a diagram illustrating a focus detection range (phase difference AF frame) 402 on a pixel array 401. An area 404 is an area in which a correlation is calculated. Note that the area 404 is a combination of the focus detection range 402 and shift areas 403 in which the correlation calculation is performed. In FIG. 4A, p, q, s, and t respectively represent coordinates in a direction along an X axis, where a range from p to q corresponds to the area 404 and a range from s to t corresponds to the focus detection range 402.

FIG. 4B is a diagram illustrating focus detection areas 405 to 409 which are subareas obtained by dividing the focus detection range 402 into five parts. In the present embodiment, by way of example, the amount of deviation from the in-focus state is calculated in each focus detection area thereby detecting a focus. In the present embodiment, an area in which a most reliable focus detection result is obtained is selected from the plurality of subareas divided as the focus detection areas, and the amount of deviation from the in-focus state calculated in this selected area is used in the AF. Note that the number of subareas obtained by dividing the focus detection range and the dividing direction are not limited to those described above.

FIG. 4C is a diagram illustrating a temporary focus detection area 410 obtained by combining the focus detection areas 405 to 409 shown in FIG. 4B. In the present embodiment, by way of example, the amount of deviation from the in-focus state calculated for the area 410 obtained by combining the focus detection areas 405-409 in the above-described manner may be used in the AF.

Note that the manner of laying out the focus detection area, the size of the area, and the like are not limited to those described above. For example, the area 404 which is a combination of the focus detection range 402 and shift areas 403 in which the correlation calculation is performed may be set in a vertical direction. Therefore, in FIG. 4A, p, q, s, and t could respectively represent coordinates in a direction along the Y axis, where a range from p to q corresponds to the area 404 and a range from s to t corresponds to the focus detection range 402. In other words, the size and direction of the focus detection area may be set differently as long as no departure occurs from the spirit of the present disclosure.

Contrast Focus Detection Frame Setting Process

Figure 5:
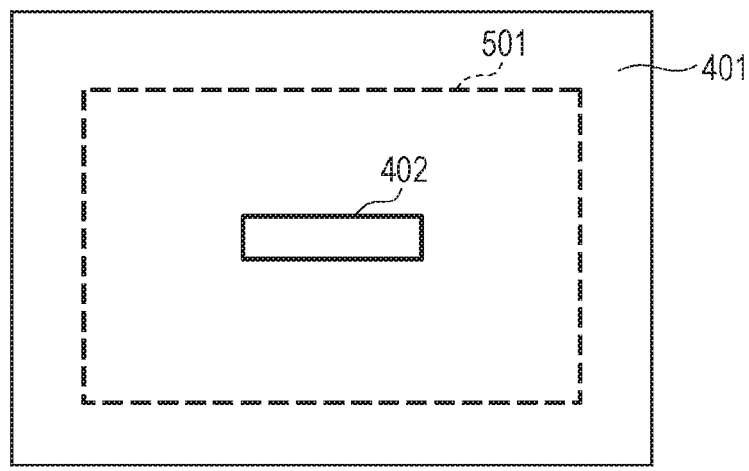
FIG. 5 is a diagram illustrating a contrast focus detection area according to a first embodiment.

Next, the process of setting the contrast focus detection frame in step S301 described above is described in further detail below with reference to FIG. 5. FIG. 5 is a diagram illustrating an example of an area in which the contrast evaluation value, used in the contrast focus detection, is calculated. In FIG. 5, elements similar to those in FIGS. 4A to 4C are denoted by similar reference numerals.

FIG. 5 illustrates a contrast focus detection frame 501 defined on the pixel array 401 of the image sensor. In the present embodiment, the contrast focus detection frame is defined in an area including the focus detection range 402 (the phase difference AF frame) described above with reference to FIGS. 4A to 4C. Based on a contrast AF evaluation value obtained in the contrast focus detection frame, a degree of focus is judged as described below.

In the present embodiment, as described above, the contrast focus detection frame 501 for use in judging the degree of focus is set in the area larger than the phase difference AF focus detection range 402, such that the contrast focus detection frame 501 includes the focus detection range 402. This makes it possible to judge whether the in-focus state is obtained over an area which is greater than the phase difference AF focus detection range 402 and closer in area size to the whole screen. Furthermore, even in a case where a change occurs in amount of defocus output from the focus detection range 402, it is possible to determine, for example, whether the subject changes due to panning or the like or due to a crossing non-intended subject. Details of the judgment method will be described later.

Hereinafter, the contrast focus detection frame 501 will also be referred to as a judgment frame. Note that the manner of laying out the focus detection frame 501 or judgment frame, the size of the area, and the like are not limited to those described above, but they may be set differently as long as no departure occurs from the spirit of the present disclosure.

In the present embodiment, an AF frame corresponding to the phase difference AF focus detection range described above with reference to FIGS. 4A to 4C is displayed on the display unit 205 such that it is superimposed on an image. A user is allowed to move the AF frame via the camera operation unit 208. Note that in the present embodiment, the focus detection frame 501 or judgment frame is not displayed.

Phase Difference Focus Detection Process

Figure 3:
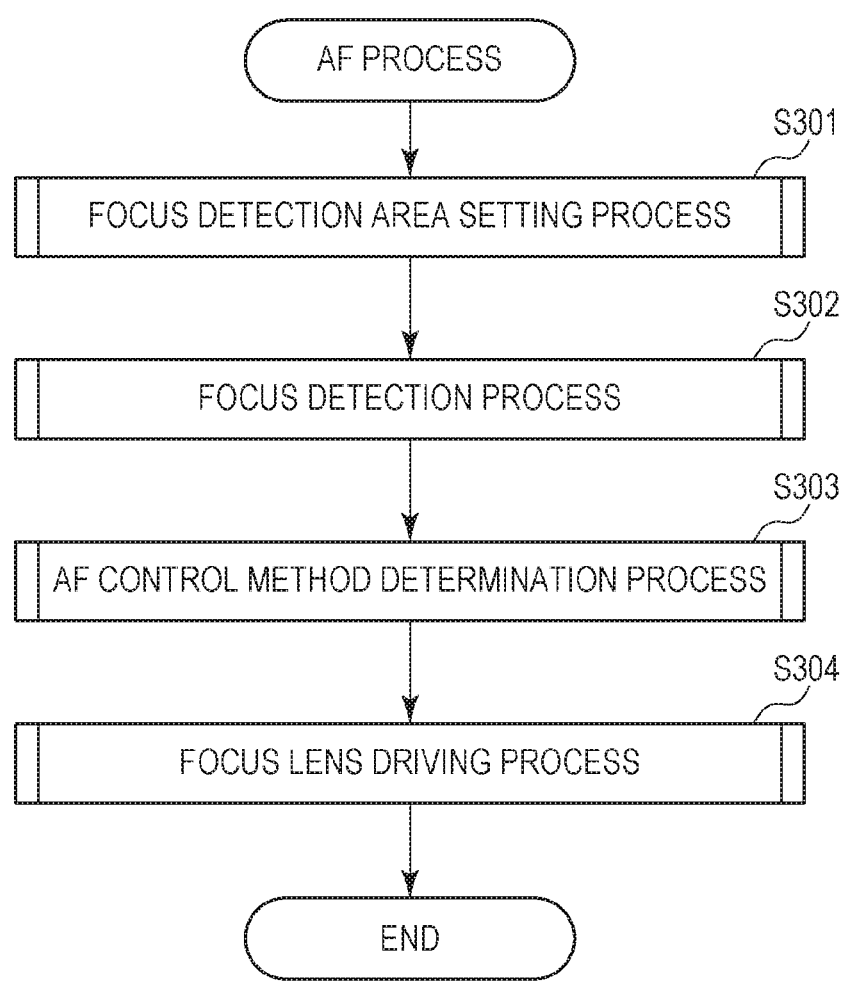
FIG. 3 is a flow chart illustrating an autofocus process according to an embodiment.

Next, the phase difference AF focus detection process in the focus detection process in S302 in FIG. 3 is described below with reference to FIG. 6. FIG. 6 is a flow chart illustrating the phase difference focus detection process.

First, in step S601, the AF signal processing unit 204 acquires a pair of image signals from the focus detection area set in step S301. In step S602, the AF signal processing unit 204 calculates an amount of correlation between the pair of image signals acquired in step S601. In step S603, the AF signal processing unit 204 calculates a change in correlation based on the amount of correlation calculated in step S602.

In step S604, the AF signal processing unit 204 calculates an amount of deviation from the in-focus state based on the amount of change in correlation calculated in step S603. In step S605, the AF signal processing unit 204 calculates a reliability level indicating how reliable the amount of deviation from the in-focus state calculated in step S604 is. The reliability level is given by a value calculated based on the degree of coincidence between two image signals, two image sharpness or the like as described above. The process in steps S601 to S605 is performed as many times as there are focus detection areas in the focus detection range described above with reference to FIGS. 4A to 4C.

Next, in step S606, the camera control unit 207 converts the amount of deviation from the in-focus state to an amount of defocus for each focus detection area. In step S607, the camera control unit 207 determines which one of the focus detection areas is to be used in the AF. Thereafter, the focus detection process is ended.

Details of Calculation of Correlation

Next, referring to FIGS. 7A to 7C and FIGS. 8A to 8D, the phase difference AF focus detection process described above with reference to FIG. 6 is described in further detail.

Figure 7A:
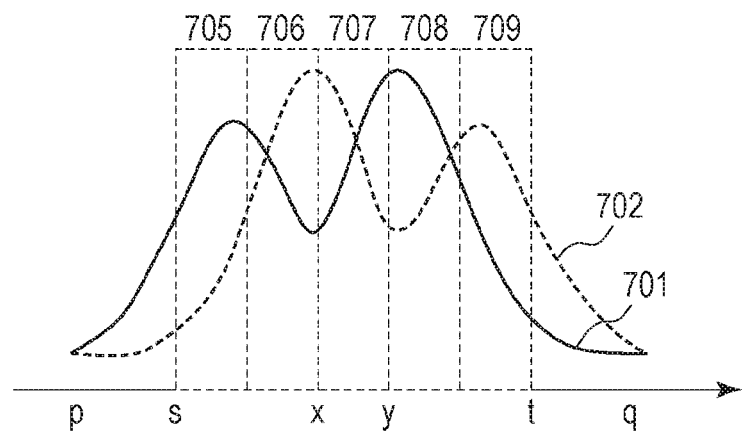
FIGS. 7A to 7C are diagrams each illustrating an image signal obtained in a focus detection area according to an embodiment.
Figure 7B:
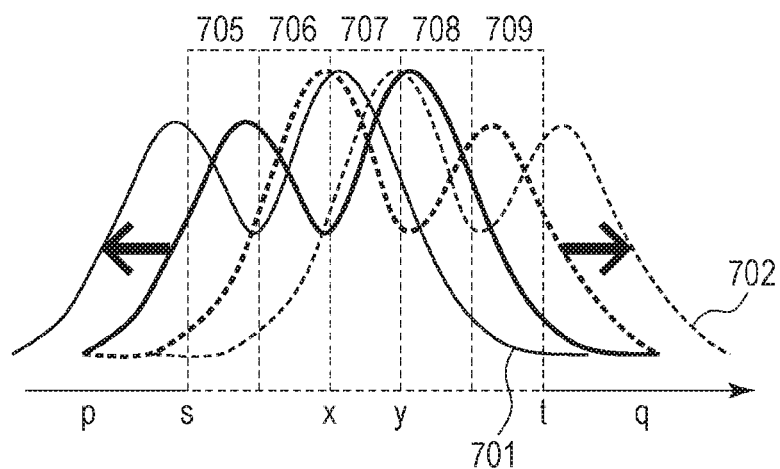
Figure 7C:
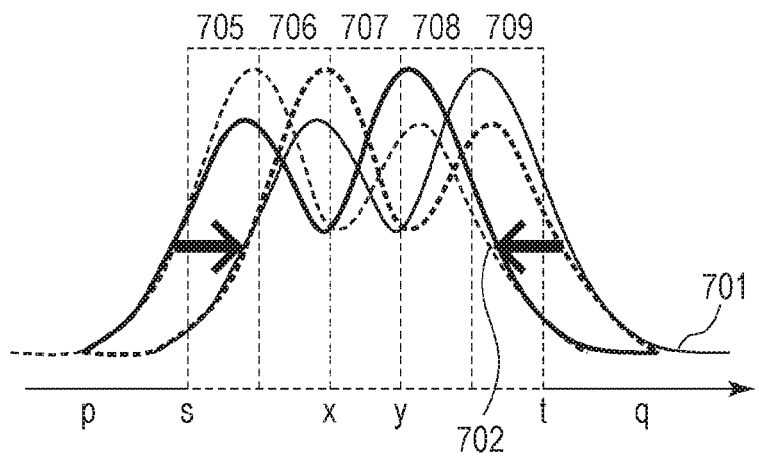

FIGS. 7A to 7C are diagrams illustrating a manner of obtaining an image signal from the focus detection area set in FIGS. 4A to 4C. A zone from s to t corresponds to a focus detection range (402 as shown in FIG. 4A), a zone from p to q corresponds to a range (404 in FIG. 4A) necessary in a focus detection calculation taking into account an amount of shift. A zone from x to y (as shown in FIG. 4B) corresponds to one divided focus detection area.

FIG. 7A is a diagram illustrating a waveform of an image signal in a state before shifting is performed. A solid line 701 represents an image signal A (A image), and a broken line 702 represents an image signal B (B image). Zones 705 to 709 correspond to the respective divided focus detection areas shown in FIGS. 4A to 4C.

FIG. 7B is a diagram illustrating an image waveform obtained by shifting in a first direction the image waveforms shown in FIG. 7A, and FIG. 7C is a diagram illustrating an image waveform obtained by shifting in a second direction the image waveforms shown in FIG. 7A. FIG. 7B shows that the image signal B (line 702) has been shifted to the right, while the image signal A (line 701) has been shifted to the left. In contrast, FIG. 7C shows that the image signal B (line 702) has been shifted to the left, while the image signal A (line 701) has been shifted to the right. In the calculation of the amount of correlation, the image signal A 701 and the image signal B 702 are shifted by one bit in respective opposite directions denoted by the dark arrows.

Next, a method of calculating the amount of correlation COR is described below. First, as described above with reference to FIGS. 7B and 7C, the image signal A and the image signal B are shifted by one bit, and the sum of the absolute value of the difference between the resultant shifted image signal A and image signal B. The amount of shift is denoted by i. The minimum number of shifts is p−s in FIGS. 7A to 7C, and the maximum number of shifts is q−t in FIGS. 7A to 7C. Note that x denotes a start coordinate of the focus detection area, and y denotes an end coordinate of the focus detection area. Using these values, the amount of correlation COR is calculated according to formula (1) described below.

$$COR[i] = \sum_{k=x}^{y} |A[k+i] - B[k-i]| \quad (1)$$

$$\{(p-s) < i < (q-t)\}$$

Figure 8A:
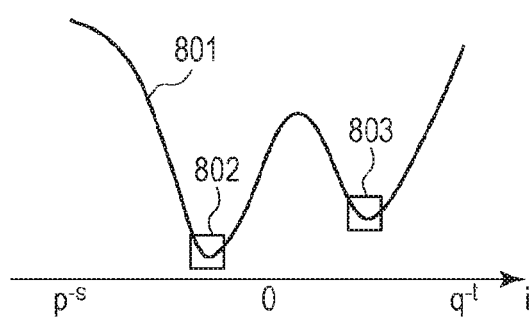
FIGS. 8A to 8D are diagrams illustrating a method of calculating a correlation according to an embodiment.

FIG. 8A is a diagram illustrating the amount of correlation in the form of a waveform. In this graph, a horizontal axis represents the amount of shift and a vertical axis represents the amount of correlation. On an amount of correlation waveform 801, areas 802 and 803 are nearby areas around local minimum values. As the amount of correlation decreases, the degree of coincidence between the A image and the B image increases.

Next, a method of calculating the amount of change in correlation ΔCOR is described below. First, based on the correlation waveform illustrated in FIG. 8A, an amount of change in correlation is calculated from the difference between one-shifted amounts of correlation. The amount of shift is denoted by i. The minimum number of shifts is p–s in FIGS. 7A to 7C, and the maximum number of shifts is q–t in FIGS. 7A to 7C. Using these values, the amount of change in correlation ΔCOR is calculated according to formula (2) described below.

$$\Delta COR[i]=COR[i-1]-COR[i+1]$$

$$\{(p-s+1)<i<(q-t-1)\} \quad (2)$$

Figure 8B:
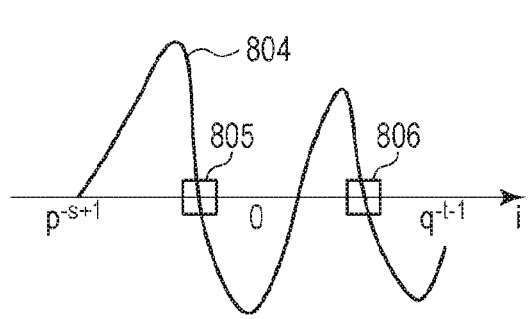

FIG. 8B is a diagram illustrating the amount of change in correlation ΔCOR in the form of a waveform. In this graph, a horizontal axis represents the amount of shift and a vertical axis represents the amount of change in correlation. On a correlation change waveform 804, the amount of change in correlation changes from a positive value to a negative value in the areas 805 and 806. A point at which the amount of change in correlation is 0 is called a zero cross point. The degree of coincidence between the A image and the B image is highest at the zero cross point, and the amount of shift in this situation gives an amount of deviation from the in-focus state.

Figure 8C:
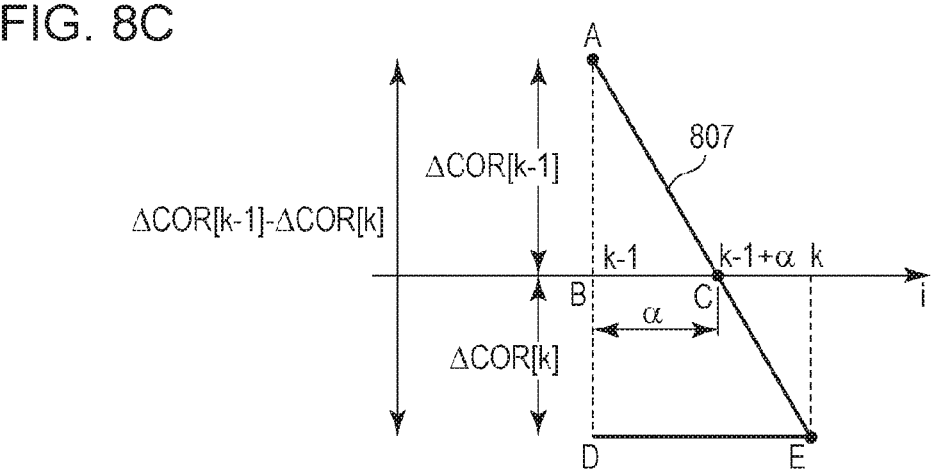

FIG. 8C is a diagram illustrating in an enlarged manner the area 805 in FIG. 8B. In FIG. 8C, 807 denotes a part of the correlation change waveform 804. Referring to FIG. 8C, a method of calculating the amount of deviation from the in-focus state PRD is described below. The amount of deviation from the in-focus state includes an integer part β and a fractional part α. The fractional part α may be calculated from a relationship between a triangle ABC and a triangle ADE, which are similar to each other, in FIG. 8C according to formula (3) described below.

$$AB{:}AD = BC{:}DE \quad (3)$$

$$\Delta COR[k-1]{:}\Delta COR[k-1]-\Delta COR[k]=\alpha{:}k-(k-1)$$

$$\alpha = \frac{\Delta COR[k-1]}{\Delta COR[k-1]-\Delta COR[k]}$$

Furthermore, the fractional part β may be calculated from FIG. 8C according to formula (4) described below.

$$\beta=k-1 \quad (4)$$

As described above, it is possible to calculate the amount of deviation from the in-focus state PRD from the sum of α and β.

In a case where there a plurality of zero cross points as in the example shown in FIG. 8B, a zero cross point at which the steepness of the change in correlation maxder (hereinafter referred to as steepness) is greater than at the other zero cross points is referred to as a first zero cross point. The steepness is a measure indicating the easiness of AF. When the steepness is higher at a zero cross point, it is easier to achieve AF at this point. The steepness may be calculated according to formula (5) described below.

$$\max der=|\Delta COR[k-1]|+|\Delta COR[k]| \quad (5)$$

As described above, in a case where there are a plurality of zero cross points, a first zero cross point is determined based on the steepness.

Next, a method of calculating the reliability level of the amount of deviation from the in-focus state is described below. The reliability level is defined by the steepness or the degree of coincidence fnclvl between two image signals A and B (hereinafter, referred to the two-image coincidence level). The degree of coincidence between two images is a measure indicating the accuracy of the amount of deviation from the in-focus state. When the two-image coincidence level has a small value, high accuracy is obtained in the amount of deviation from the in-focus state.

Figure 8D:
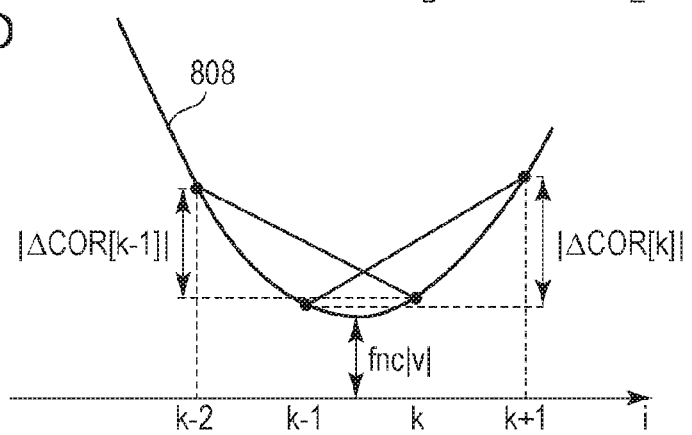

FIG. 8D is a diagram illustrating in an enlarged manner the area 802 in FIG. 8A. In FIG. 8D, 808 denotes a part of the correlation waveform 801. The two-image coincidence level may be calculated according to formula (6) described below.

when $|\Delta COR[k-1]|\times 2 \leq \max der$ $$fnclvl=COR[k-1]+\Delta COR[k-1]/4 \quad (i)$$

when $|\Delta COR[k-1]|\times 2 > \max der$ $$fnclvl=COR[k]-\Delta COR[k]/4 \quad (6)$$

Details of Contrast Focus Detection Process

Next, referring to FIG. 9, the contrast focus detection process in the focus detection process in S302 in FIG. 3 is described in detail below.

Figure 9:
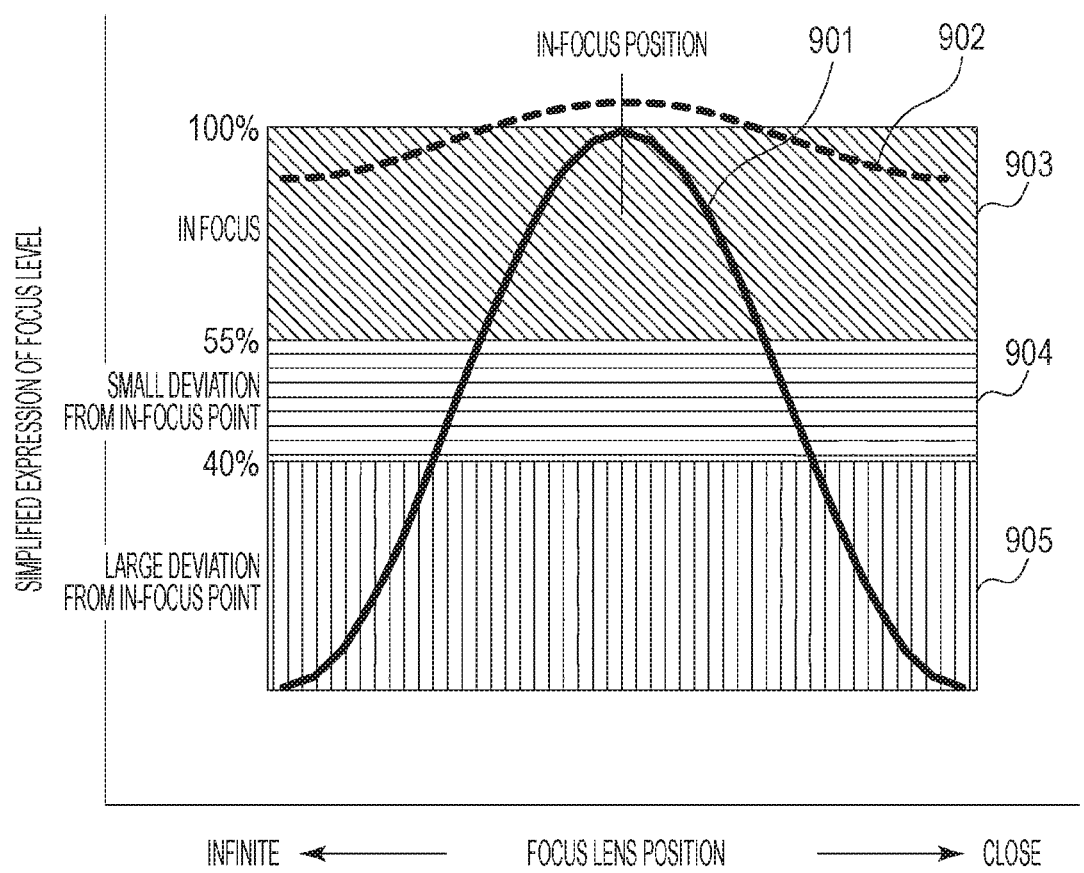
FIG. 9 is a diagram illustrating a concept of a degree of focus in simple expression according to an embodiment.

FIG. 9 is a diagram illustrating a change in contrast evaluation value 901 as a function of the focus lens position for a particular object. As illustrated in FIG. 9, as the focus lens position becomes closer to an in-focus position, the value of the contrast evaluation value 901 increases. Conversely, as the focus lens position goes away farther from an in-focus position, the value of the contrast evaluation value 901 decreases. In the present embodiment, the contrast evaluation value is given as follows. The image signal in the contrast focus detection frame 501 is passed through a high frequency filter that allows high frequency components higher than a particular cutoff frequency to pass through, and the contrast evaluation value is given by a value determined based on the high frequency components output from the high frequency filter (hereinafter the value will be referred to as EP).

In FIG. 9, zones 903 to 905 conceptually represent degrees of focus expressed in a simplified manner. The degree of focus in simple expression is given by a value obtained by dividing EP described above by a maximum contrast value (hereinafter referred to as MMP). In FIG. 9, a dotted line 902 conceptually represents a change in MMP as a function of the focus lens position.

As shown in FIG. 9, the change in MMP as a function of the focus lens position is smaller than that in the contrast evaluation value (EP) described above. This is because the contrast of luminance is substantially the same regardless of the degree of focus as long as the same object is captured. By calculating the degree of focus in simple expression (EP/MMP) represented by normalizing EP with respect to subject-dependent MMP, it is possible to suppress a subject-dependent change in contrast evaluation value to a certain degree.

In the present embodiment, when the degree of focus in simple expression (EP/MMP) has a value equal to or greater than 55%, the focus is regarded as in an in-focus state. When the degree of focus in simple expression (EP/MMP) has a value equal to or greater than 40%, the focus is regarded as having a slight deviation from in-focus state. When the degree of focus in simple expression (EP/MMP) has a value less than 40%, the focus is regarded as having a large deviation from in-focus state. Note that the threshold values used in evaluating the degree of focus in simple expression are merely examples, and the threshold values are not limited to those described above.

AF Control Method Determination Process

Figure 10:
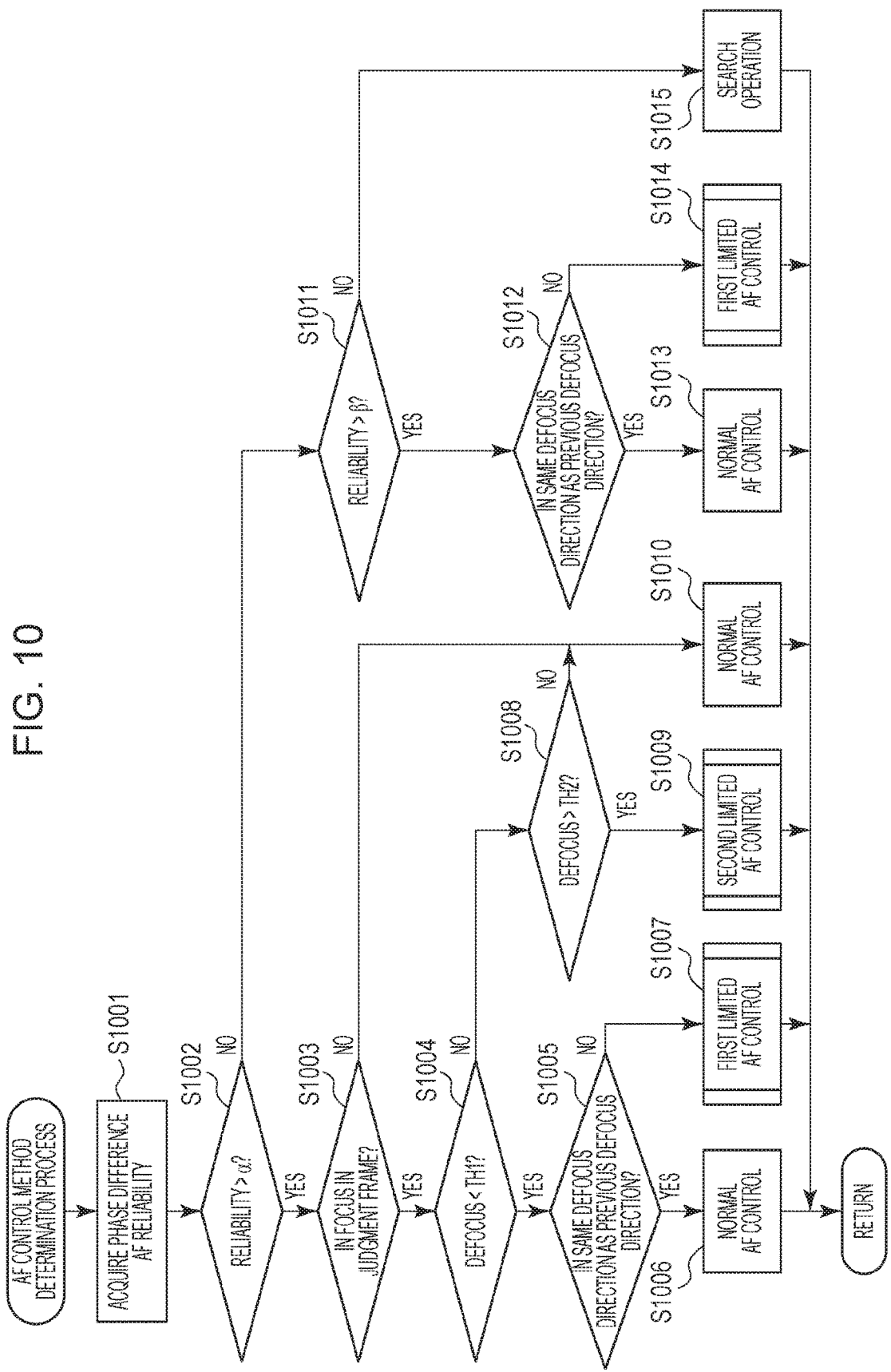
FIG. 10 is a flow chart illustrating an AF control method determination process according to the first embodiment.

Next, referring to FIG. 10 and FIG. 12, the AF control method determination process in step S303 in FIG. 3 is described in further detail below. FIG. 10 is a flow chart illustrating the AF control method determination process.

First, in step S1001, the camera control unit 207 acquires a reliability level of an image signal in a determined focus detection area. Furthermore, to make it possible to use, in later steps, history information on defocus information (including defocus direction information), the camera control unit 207 stores, in a non-illustrated RAM, the defocus information calculated for the determined focus detection area.

In next step S1002, a determination is made as to whether the reliability level is higher than a predetermined threshold value α. The threshold value α is a threshold value used in determining whether the calculated amount of defocus is sufficiently reliable. If the reliability level is higher than the threshold value α, the processing flow proceeds to step S1003, but if the reliability level is equal to or lower than the threshold value α, the processing flow proceeds to step S1011.

Next, in step S1003, the camera control unit 207 determines whether the judgment frame is in focus as expressed in the degree of focus in simple expression. In a case where it is determined that the judgment frame is in focus, the processing flow proceeds to step S1004, but in a case where it is determined that the judgment frame is not in focus, the processing flow proceeds to step S1010.

Next, in step S1004, the camera control unit 207 determines whether the amount of defocus is smaller than a first threshold value TH1. In a case where the amount of defocus is smaller than the first threshold value TH1, the processing flow proceeds to step S1005, but in a case where the amount of defocus is equal to or greater than the first threshold value TH1, the processing flow proceeds to step S1008.

Next, in step S1005, the camera control unit 207 determines, from the stored history of defocus information, whether the calculated defocus direction is the same as a past defocus direction. In a case where it is determined that the calculated defocus direction is the same as the past defocus direction, the processing flow proceeds to step S1006, but in a case where it is determined that the calculated defocus direction is different from the past defocus direction, the processing flow proceeds to step S1007.

The determination as to whether the calculated defocus direction is the same as the past defocus direction may be made, for example, as follows. In a case where one piece of past data in the history information is referred to, the determination is made by determining whether the calculated defocus direction is the same as the immediately previous defocus direction. In a case where n (n≥2) pieces of past data in the history information is referred to, the majority of n pieces of past data is determined in terms of the defocus direction, and the determination is made as to whether the calculated defocus direction is the same as the previous defocus direction is made by making a comparison with the major previous defocus direction. An alternatively method is to calculate the average of the n pieces of past data in terms of the defocus direction and the amount of defocus, and determine whether the calculated defocus direction is the same as the average. In the calculation of the average, a greater weight may be applied to a newer amount of defocus, and the determination may be made as to whether the calculated defocus direction is the same as the average. Note that the determination methods described above are merely examples, and the determination method is not limited to those descried above.

In step S1006, the camera control unit 207 makes the setting such that the normal AF control is performed based on the calculated amount of defocus thereby achieving a high-response AF control. Thereafter, the process is ended. FIG. 12 is a table illustrating a manner of setting the AF control method depending on a condition in terms of the amount of defocus detected in the phase difference AF frame and the degree of focus detected in the judgment frame. The control mode set in step S1006 corresponds to "[1] Normal AF control" in the table shown in FIG. 12.

On the other hand, in step S1007, the camera control unit 207 performs the AF control with a first limitation depending on the calculated amount of defocus. The first limitation will be described later with reference to FIG. 11A. The control mode set in step S1007 corresponds to "[2] First limited AF control (so as to prevent fluctuation in focus)" in the table shown in FIG. 12.

When the calculated amount of defocus is smaller than the threshold value TH1, it is determined that an object captured in the phase difference AF frame is located close to an in-focus point. However, there is a possibility that, for example, in a situation in which an object is moving within a screen, a change in picture pattern in the phase difference AF frame or a change in a manner in which the object partially extends off the frame or other factors may cause an error (unevenness) to occur in the calculation of the correlation. In such a situation, if the focus lens is driven simply by an amount exactly corresponding to the calculated amount of defocus, the amount of driving the focus lens includes the above-described error, which may cause an unnecessary change (fluctuation) in focus. To handle the above situation, when the judgment frame is in focus in evaluation of the degree of focus in simple expression and the output amount of defocus is smaller than TH1, if the detected defocus direction fluctuates, a first limited AF control described below is employed to prevent the fluctuation in focus.

In step S1008, the camera control unit 207 determines whether the calculated amount of defocus is greater than a second threshold value TH2 (TH2>TH1). In a case where the amount of defocus is greater than the second threshold value TH2, the processing flow proceeds to step S1009, but in a case where the amount of defocus is equal to or smaller than the second threshold value TH2, the processing flow proceeds to step S1010.

In a state in which the judgment frame is in focus evaluated in degree of focus in simple expression, when the output amount of defocus is greater than TH2, there is a possibility that a non-intended object is crossing the phase difference AF frame. In such a situation, if the focus lens is driven simply by an amount exactly corresponding to the calculated amount of defocus, the camera control unit 207 tries to achieve an in-focus state for the crossing object. Therefore, when the crossing object goes out of the phase difference AF frame, the image comes out of focus. To hand the situation described above, when the amount of defocus is calculated in the state in which the judgment frame is determined as being in focus, if the calculated amount of defocus is greater than TH2, then there is a possibility that a non-intended object is crossing the phase difference AF frame, and thus a second limited AF control described below is employed to suppress an error in the AF control operation.

In step S1009, the camera control unit 207 performs the AF control within a second limitation depending on the calculated amount of defocus. The second limitation will be described later with reference to FIG. 11B. The control mode set in step S1009 corresponds to "[3] Second limited AF control (so as to handle crossing of an object)" in the table shown in FIG. 12.

On the other hand, in step S1010, the camera control unit 207 makes the setting such that the normal AF control is performed based on the calculated amount of defocus thereby achieving a high-response AF control (normal AF control). Thereafter, the process is ended. The control mode set in step S1010 corresponds to "[4] Normal AF control" or "[5] Normal AF control" in the table shown in FIG. 12.

In a case where it is determined in step S1002 that the reliability level of the image signal in the focus detection area is equal to or lower than the predetermined threshold value α, then in step S1011 a determination is made as to whether the reliability level is higher than a predetermined threshold value β (β<α). The threshold value β is a threshold value used in determining whether the detected defocus direction is sufficiently reliable. In a case where the reliability level is higher than the threshold value β, the processing flow proceeds to step S1012, but in a case where the reliability level is equal to or lower than the threshold value β, the processing flow proceeds to step S1015.

In step S1012, the camera control unit 207 determines, from the stored history of defocus information, whether the calculated defocus direction is the same as a past defocus direction. In a case where it is determined that the calculated defocus direction is the same as the past defocus direction, the processing flow proceeds to step S1013, but in a case where it is determined that the calculated defocus direction is different from the past defocus direction, the processing flow proceeds to step S1014.

Next, in step S1013, the camera control unit 207 makes the setting such that the normal AF control is performed based on the detected defocus direction thereby achieving a high-response AF control. Thereafter, the process is ended. The control mode set in step S1013 corresponds to "[1] Normal AF control" in the table shown in FIG. 12. In this case, the defocus direction is sufficiently reliable although the calculated amount of defocus is low in reliability, and thus the normal AF control mode is employed and the focus lens is driven by a predetermined amount based on the detected defocus direction.

On the other hand, in step S1014, the camera control unit 207 performs the AF control using the detected defocus direction within the first limitation. The control mode set in step S1014 corresponds to "[2] First limited AF control (so as to prevent fluctuation in focus)" in the table shown in FIG. 12.

In a case where the processing flow proceeds to step S1015, the phase difference AF is low in reliability (in terms of the amount of defocus and the defocus direction), and thus the result of the focus detection by the phase difference AF is not used. Therefore, the camera control unit 207 performs AF control including a search operation in which the focus lens is driven from a closest side to an infinite side.

Details of Limited AF Control

Figure 11A:
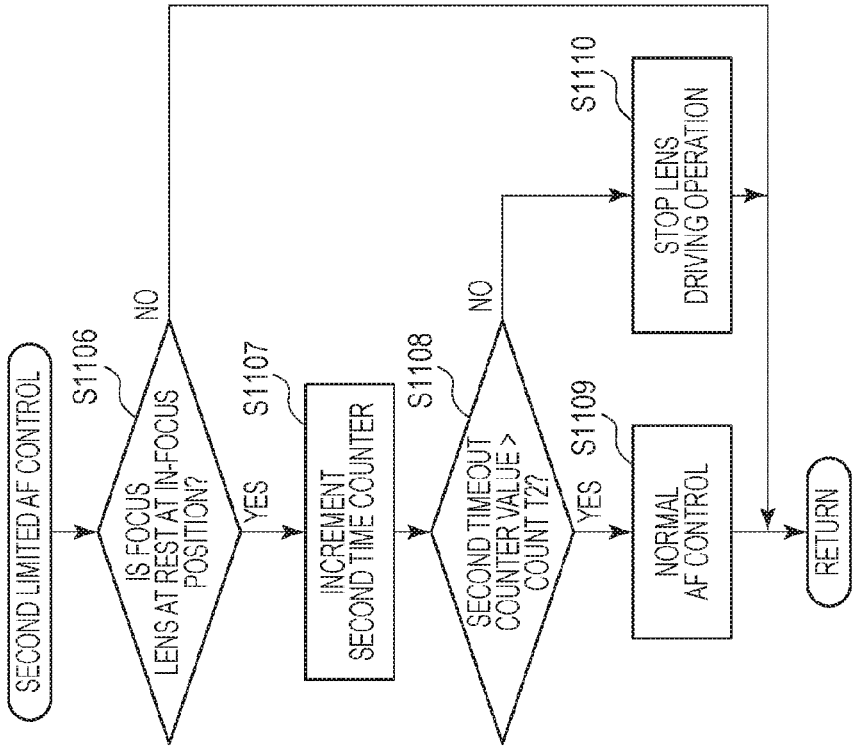
FIGS. 11A and 11B are flow charts respectively illustrating first and second limited AF control processes according to an embodiment.

Next, referring to FIGS. 11A and 11B, the first limited AF control in step S1007 and S1014 and the second limited AF control in step S1009 in FIG. 10 are described below. First, referring to FIG. 11A, the first limited AF control is described. FIG. 11A is a flow chart illustrating the first limited AF control process.

In step S1101, the camera control unit 207 determines whether the focus lens is at rest at an in-focus position. In a case where the focus lens is not at rest at an in-focus position, the processing flow proceeds to step S1102. In a case where the focus lens is at rest at an in-focus position, the process is ended. When the focus lens is in a state in which the focus lens is at rest at an in-focus position, the first limited AF control is not performed as descried above, thereby preventing the focus lens from being driven based on the defocus acquired by the camera control unit 207 in the state in which the focus lens is at rest at the in-focus position.

In step S1102, in the case where the camera control unit 207 determines that the first limited AF control is to be performed, the camera control unit 207 increments a first timeout counter that counts a time within which the AF control is limited.

Next, in step S1103, the camera control unit 207 determines whether the count of the first timeout counter has reached a value greater than a count T1 which is a predetermined threshold value in terms of the time limit. In a caser where the count of the first timeout counter is greater than the count T1, the processing flow proceeds to step S1104, but in a caser where the count of the first timeout counter is equal to or smaller than the count T1, the processing flow proceeds to step S1105.

During the period in which the AF control is limited, the camera control unit 207 performs step S1105 such that the focus lens is not driven or AF control is performed by driving the focus lens by a driving amount smaller than in the normal AF control. In this step, the driving amount is reduced to a value smaller by an amount corresponding to a particular amount of defocus than that employed in the normal AF control or reduced by a particular ratio such that the focus lens is driven by the reduced driving amount thereby suppressing an error in the AF operation (that is, a fluctuation close to an in-focus position is suppressed). Note that in the control operation in step S1014, the phase difference AF is further lower in reliability than in step S1007, and thus the driving amount is reduced by a further greater ratio from the normal driving amount. When the period, in which the AF control is limited, has reached a predetermined value (T1), the processing flow proceeds to step S1104 in which the camera control unit 207 switches the control mode in the normal AF control mode, and ends the process. Note that the predetermined amount of defocus or the predetermined ratio may be changed depending on characteristics of the lens or a condition of the aperture, the focal length, the distance to the object, or the like.

Figure 11B:
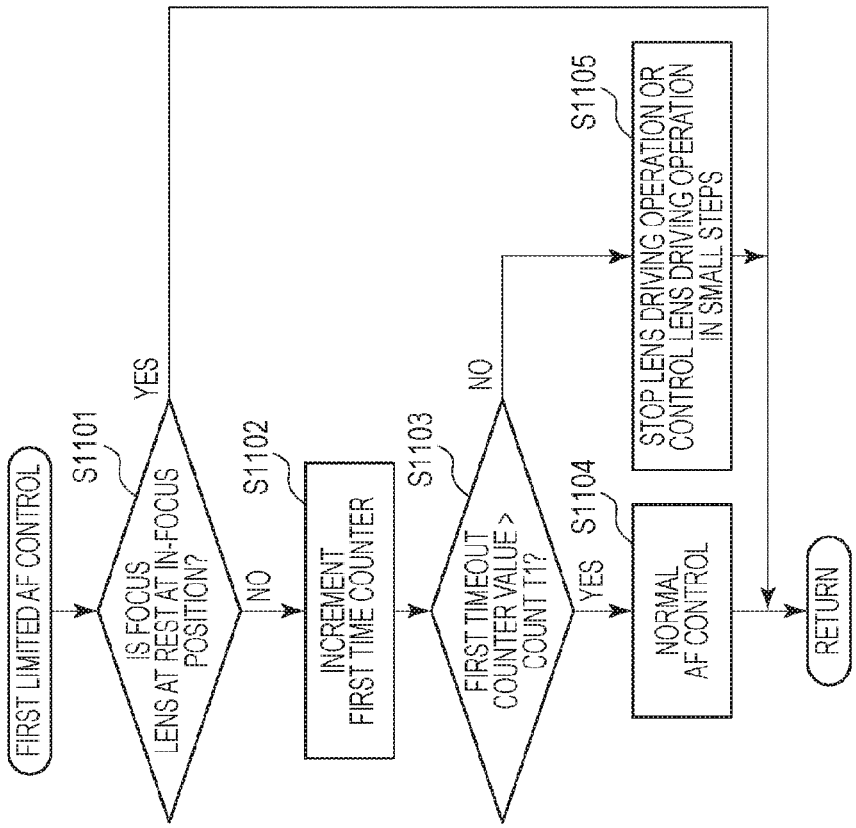

Next, referring to FIG. 11B, the second limited AF control is described. FIG. 11B is a flow chart illustrating the second limited AF control process.

First, in step S1106, the camera control unit 207 determines whether the focus lens is at rest at an in-focus position. In a case where the focus lens is at rest at an in-focus position, the processing flow proceeds to step S1107, but in a case where the focus lens is not at rest at an in-focus position, the process is ended. When the focus lens is being driven, the second limited AF control is not performed as described above thereby preventing the responsivity from being degraded when a large movement occurs in an object when the focus lens is being driven. Although not described in FIG. 11B, when the focus lens is being driven, a defocus threshold value may be set to be greater than TH2 to determine whether crossing occurs thereby making it possible to respond to a large movement of an object.

In step S1107, in the case where the camera control unit 207 determines that the second limited AF control is to be performed, the camera control unit 207 increments a second timeout counter that counts a time during which the AF control is limited.

Next, in step S1106, the camera control unit 207 determines whether the count of the second timeout counter has reached a value greater than a count T2 which is a predetermined threshold value. In a caser where the count of the second timeout counter is greater than the count T2, the processing flow proceeds to step S1109, but in a caser where the count of the second timeout counter is equal to or smaller than the count T2, the processing flow proceeds to step S1110.

When the AF control is limited, in step S1110, the camera control unit 207 stops driving the focus lens to suppress an error in the AF operation (an operation of trying to achieve an in-focus state for a wrong object which is crossing). When the period, in which the AF control is limited, has reached a predetermined value (T2), the processing flow proceeds to step S1109 in which the camera control unit 207 switches the control mode in the normal AF control mode, and ends the process.

Note that in the second limited AF control process, unlike the first limited AF control, the amount of driving the focus lens is not set to be smaller than in the normal AF control. A reason for this is that even if the driving amount is reduced, performing the AF control causes the focus from moving away from an original which was in focus before a cross object appears and thus causes the original object to be out of focus when the crossing object goes out of the frame.

The first timeout counter and the second timeout counter are reset when the camera is started, the camera mode is switched, or the camera control unit 207 determines to perform the normal AF control. Note that in a case where the limited AF control operation in step S1105 is performed without time limit as long as the AF control is performed within a range close to the in-focus position without fluctuation in focus, the count T1 may be set to a value that the first timeout counter does not reach.

In the present embodiment, as described above, the focus judgment is performed based on a contrast evaluation value in the judgment frame greater than the phase difference AF frame, and if it is determined that the judgment frame is in focus, the AF control is limited depending on the phase difference AF result. More specifically, in a case where it is determined that the phase difference AF frame is in a state close to an in-focus state but the detected defocus direction fluctuates, the driving amount of the focus lens is reduced to a small value or the driving is stopped for a predetermined time period thereby suppressing a fluctuation in focus. On the other hand, in a case where although it is determined that the judgment frame is in focus, a large amount of defocus is detected in the phase difference AF, the driving of the focus lens is stopped for a predetermined time period thereby suppressing the possibility that the focus is moved to an object different from an intended object. By performing the control in the above-described manner, it becomes possible to achieve high-quality focusing even in a case where a change occurs in a condition of an object or an image capture condition.

Second Embodiment

Next, a second embodiment of the present disclosure is described below with reference to FIG. 13 to FIG. 15. Elements similar to those in the first embodiment are denoted by similar reference numerals and a further description there is omitted.

Contrast Focus Detection Frame Setting Process

The second embodiment is different from the first embodiment in that a plurality of contrast focus detection frames (judgment frames) are set. First, a process of setting the contrast focus detection frame according to the present embodiment is described with reference to FIG. 13.

Figure 13:
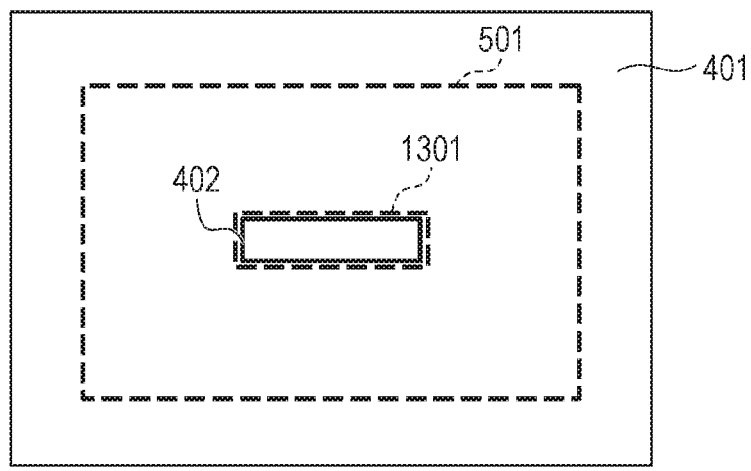
FIG. 13 is a diagram illustrating a contrast focus detection area according to a second embodiment.
Figure 14:
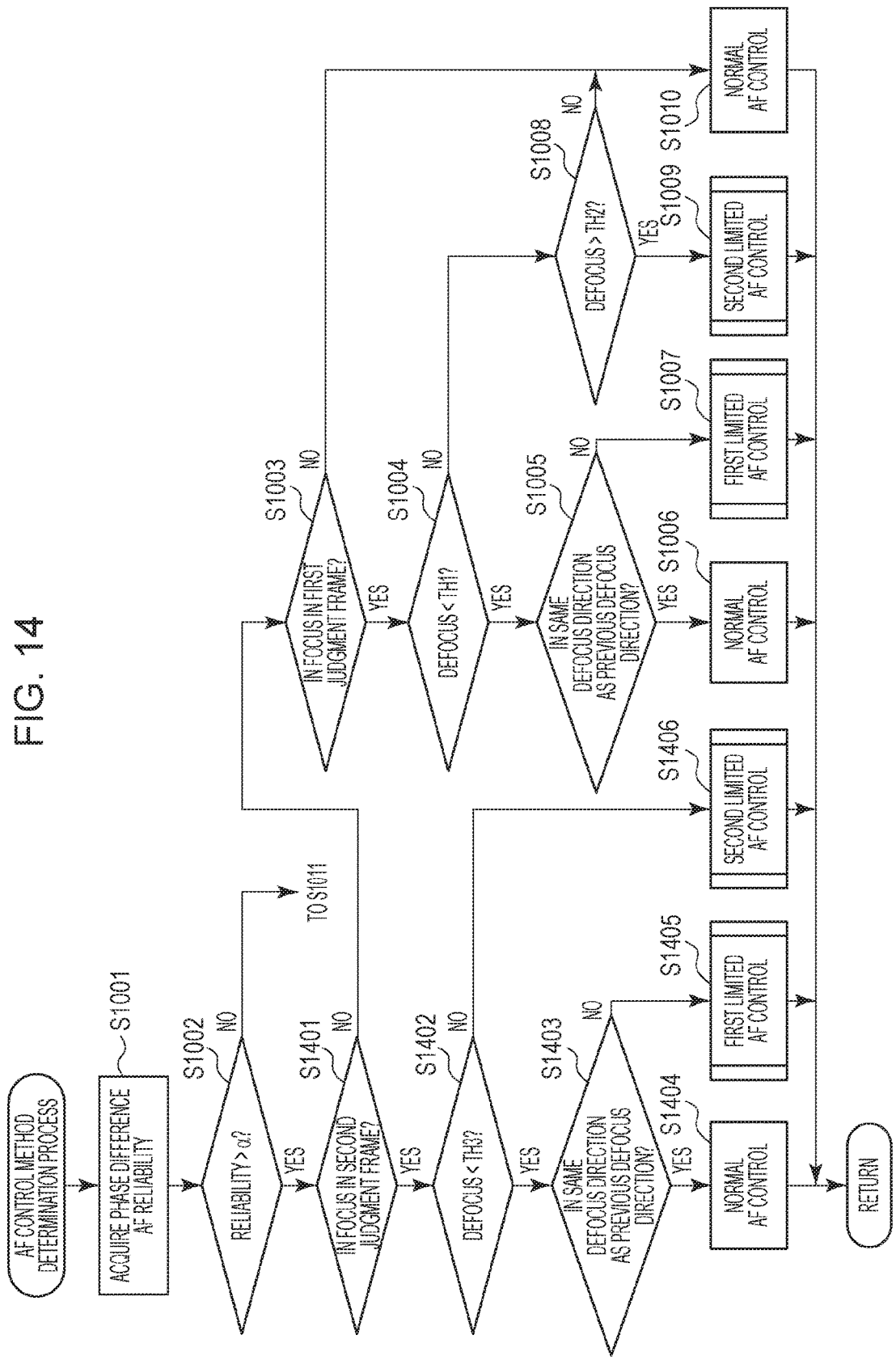
FIG. 14 is a flow chart illustrating an AF control method determination process according to the second embodiment.

FIG. 13 is a diagram illustrating a contrast focus detection frame 1301 similar in size to the phase difference AF frame 402 in addition to a contrast-based focus detection frame 501, similar to that illustrated in FIG. 5, formed on the pixel array 401 of the image sensor. By providing the contrast-based focus detection frame 1301 having a similar size to that of the phase difference AF frame 402 in addition to the contrast-based focus detection frame 501, it becomes possible to perform a first limited process and a second limited process described below with improved accuracy in judgement.

Hereinafter, the contrast-based focus detection frame 1301 will be referred to as a second judgment frame, and the judgment frame similar to that according to the first embodiment will be referred to as a first judgment frame. The second judgment frame is smaller in size than the first judgment frame, and is defined in an area including the phase difference AF frame. It may be desirable to define the second judgment frame in an area having substantially the same size as that of the phase difference AF frame. Note that the manner of laying out the judgment frames, the size of the areas, and the like are not limited to those described below, but modifications are possible as long as no departure occurs from the spirit of the present disclosure. Furthermore, also two types of judgment frames are defined in the present embodiment, three or more types of judgment frames may be defined as long as no departure occurs from the spirit of the present disclosure.

AF Control Method Determination Process

Next, referring to FIG. 14 and FIG. 15, the AF control method determination process in step S303 in FIG. 3 is described in detail below for a case where the AF control method determination process is performed according to the second embodiment. FIG. 14 is a flow chart, corresponding to FIG. 10 in the first embodiment, illustrating the AF control method determination process according to the second embodiment. In FIG. 14, similar steps to those in FIG. 10 are denoted by similar step number and a further description thereof is omitted.

First, in step S1001, a reliability level of the phase difference AF frame is acquired. If it is determined in step S1002 that the reliability level is higher than a predetermined threshold value α, the processing flow proceeds to step S1401. In a case where the reliability level is equal to or lower than the threshold value α, the processing flow proceeds to step S1011 in FIG. 10 and the following process is performed in a similar manner as shown in FIG. 10.

In step S1401, the camera control unit 207 determines whether the second judgment frame is in focus evaluated in the degree of focus in simple expression. In a case where it is determined that the second judgment frame is in focus, the processing flow proceeds to step S1402, but in a case where it is determined that the second judgment frame is not in focus, the processing flow proceeds to step S1003. The processes in steps S1003 to S1010 are similar to those in FIG. 10. In this case, the first judgment frame is given by the judgment frame shown in FIG. 10.

In step S1402, the camera control unit 207 determines whether the amount of defocus calculated in step S1001 is smaller than a third threshold value TH3. In a case where the amount of defocus is smaller than the third threshold value TH3, the processing flow proceeds to step S1403, but in a case where the amount of defocus is equal to or greater than the third threshold value TH3, the processing flow proceeds to step S1406.

In a case where the calculated amount of defocus is smaller than the threshold value TH3, it is determined that an object captured in the phase difference AF frame is located close to an in-focus point. However, there is a possibility that, for example, in a situation in which an object is moving within a screen, a change in a picture pattern in the phase difference AF frame or a change in a manner in which the object partially extends off the frame or other factors may cause an error (unevenness) to occur in the calculation of the correlation. In such a situation, if the focus lens is driven simply by an amount exactly corresponding to the calculated amount of defocus, the amount of driving the focus lens includes the above-described error, which may cause the focus to fluctuate.

On the other hand, in a case where although it is determined that the second judgment frame is in focus, the output amount of defocus is greater than TH3, there is a possibility that the calculated amount of defocus is not correct. In view of the above, to suppress an error in the AF control operation, the second limited AF control described below is performed. Note that in the present embodiment, the second judgment frame is defined in an area that is smaller than the area of the first judgment frame and is substantially the same of the area of the phase difference AF frame, and thus the third threshold value is set to be equal to or smaller than the first threshold value (TH3≤TH1).

Next, in step S1403, the camera control unit 207 determines, from the history of defocus information, whether the detected defocus direction is the same as a past defocus direction. In a case where it is determined that the calculated defocus direction is the same as the past defocus direction, the processing flow proceeds to step S1404, but in a case where it is determined that the calculated defocus direction is different from the past defocus direction, the processing flow proceeds to step S1405. The determination as to whether the detected defocus direction is the same as the past defocus direction may be performed in a similar manner to the first embodiment, and thus a further description thereof is omitted.

Next, in step S1404, the camera control unit 207 makes the setting such that the normal AF control is performed based on the calculated amount of defocus thereby achieving a high-response AF control. Thereafter, the process is ended.

FIG. 15 is a table illustrating a manner of setting the AF control method depending on a condition in terms of the amount of defocus detected in the phase difference AF frame and the degree of focus detected in the first judgment frame and the second judgment frame. The control mode set in step S1404 corresponds to "[5] Normal AF control" in the table shown in FIG. 15.

In step S1405, the camera control unit 207 performs the AF control within the above-described first limitation depending on the calculated amount of defocus. The control mode set in step S1405 corresponds to "[6] First limited AF control (so as to prevent fluctuation in focus)" in the table shown in FIG. 15.

On the other hand, in step S1406, the camera control unit 207 performs the AF control within the above-described second limitation depending on the calculated amount of defocus. The control mode set in step S1406 corresponds to "[7] Second limited AF control (so as to handle crossing of an object)" in the table shown in FIG. 15.

In the present embodiment, as described above, the focus judgment is performed based on, in addition to a contrast evaluation value in the judgment frame (first judgment frame) described above in the first embodiment, a contrast evaluation value in the second judgment frame smaller in size than the first judgment frame. Thus, when it is determined that the second judgment frame is in focus, it is possible to more effectively prevent a reduction in image quality due to a fluctuation in AF. Furthermore, even in a case where it is determined that the second judgment frame is not in focus because a non-intended object is crossing the second judgment frame or for some reason, the focus judgment may be performed using the first judgment frame in a similar manner to the first embodiment. This allows it to suppress the probability that the intended object goes out of focus.

Third Embodiment

Next, a third embodiment of the present disclosure is described. In the present embodiment, the threshold values used in the first and second embodiments in terms of first threshold value TH1, the second threshold value TH2, the third threshold value TH3, and the count T1 and the count T2 which are the threshold values defining the time limits, are changed depending on a situation.

In the present embodiment, using the camera operation unit 208 shown in FIG. 1, a user is allowed to switch an image capture mode between a movie mode (in which a moving image is captured and stored) and a still image mode. When a moving image is captured, a stable AF operation is necessary. Therefore, when a user switches the image capture mode to the movie mode, the threshold values described above are changed to more strict values than in the still image mode. More specifically, the first threshold value TH1 and the third threshold value TH3 are changed to greater values, while the second threshold value TH2 is changed to a smaller value. By changing the threshold values in the above-described manner, it is possible to expand the range within which the AF control is limited, which results in higher stability in the AF control.

In the movie mode, by changing also the values of the count T1 and the count T2 to greater values, it is possible to increase the period during which the AF control is limited, which results in higher stability in the AF control.

On the other hand, when a still image is captured, it is important to achieve a quick response to a change in an object. Therefore, in the still image mode, as opposed to the movie mode, the various threshold values are set to be looser (threshold values set to great values in the movie mode are set to smaller values, and threshold values set to small values in the movie mode are set to greater values). This makes it possible to increase the AF responsivity.

Furthermore, the threshold values are changed depending on whether the depth of field is small or large, whether the object distance is small or large, or whether the focal length is large or small, as described below.

First, in a case where the depth of field is small, or the object distance is small, or the focal length is large, the threshold values are changed as follows. the first threshold value TH1 and the third threshold value TH3 are changed to greater values, and the second threshold value TH2 is changed to a smaller value. The count T1 and the count T2 are also changed to greater values.

On the other hand, in a case where the depth of field is large, or the object distance is large, or the focal length is small, the respective threshold values are set oppositely (such that threshold values set to be large are set to be small, and threshold values set to be small are set to be large).

Next, a reason why the first threshold value TH1 and the third threshold value TH3 are set to large values is described below. In a case where the depth of field is small because the focal length is large or for some reason, even a small movement of the focus lens may cause a deviation of focus. Therefore, even in a case where the detected amount of defocus is greater than that obtained in the focus judgment close to the in-focus position, it may be desirable to perform the first limited AF control.

Also in a case where the object distance is small, the depth of focus becomes small, and thus even a small movement of the focus lens may cause a deviation of focus. Therefore, even in a case where the detected amount of defocus is greater than that obtained in the focus judgment close to the in-focus position, it may be desirable to perform the first limited AF control.

The second threshold value is set to a small value for the following reasons. When an image is being taken with a small depth of field, if a large amount of defocus is detected, then there is a high possibility that this is because a non-intended object has come into the AF frame. In view of the above, by expanding the range of amount of defocus in which a determination of capturing a non-intended object is performed, it becomes possible to reduce the probability of the AF error.

The each threshold value may be changed depending on all or at least one of the factors described above. All threshold values may be changed or at least one of the threshold values may be changed.

The present disclosure has been described above with reference to embodiments. However, the present disclosure is not limited to details of the embodiments descried above, the present disclosure may be implemented in various forms without departing from the spirit of the disclosure.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like. While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-056427, filed Mar. 19, 2015, which is hereby incorporated by reference herein in its entirety.

What is claimed is:

1. An automatic focus adjustment apparatus comprising:
   an image sensor configured to generate an image signal by performing a photoelectric conversion on a light flux incident via an image pickup optical system including a focus lens;
   a first focus detection unit configured to detect defocus information by a phase difference detection;
   a second focus detection unit configured to detect a focus state based on the image signal;
   a setting unit configured to set on the image sensor a first range in which the first focus detection unit detects the defocus information and a second range in which the second focus detection unit detects the focus state; and
   a control unit configured to control driving the focus lens based on the defocus information detected by the first focus detection unit,
   wherein the setting unit sets the second range such that the second range includes the first range, and
   wherein, in a case where the focus state in the second range detected by the second focus detection unit is in an in-focus state, the control unit changes a control mode into a predetermined control mode in which the control unit limits the driving of the focus lens according to the defocus information in the first range detected by the first focus detection unit.

2. The automatic focus adjustment apparatus according to claim 1, wherein the first focus detection unit detects the defocus information based on a phase difference between a pair of image signals generated at the image sensor.

3. The automatic focus adjustment apparatus according to claim 1, wherein the second focus detection unit detects a focus state based on an evaluation value obtained using a predetermined frequency component of the image signal.

4. The automatic focus adjustment apparatus according to claim 1,
   wherein the setting unit sets on the image sensor a third range in which the second focus detection unit detects a focus state, the third range is smaller than the second range, and
   wherein the control unit changes a condition for switching the control mode to the predetermined control mode depending on whether the focus state in the third range detected by the second focus detection unit is an in-focus state.

5. The automatic focus adjustment apparatus according to claim 4,
   wherein the defocus information includes an amount of defocus and a defocus direction,
   wherein, in a case where the focus state in the third range detected by the second focus detection unit is not an in-focus state, the control unit determines whether the focus state in the second range is in an in-focus state, and wherein, in a first case in which the focus state in the second range detected by the second focus detection unit is an in-focus state and the amount of defocus detected by the first focus detection unit is less than a first threshold value, the control unit changes the control mode to the predetermined control mode according to the detected defocus direction.

6. The automatic focus adjustment apparatus according to claim 5,
wherein, in a case in which the focus state in the third range detected by the second focus detection unit is an in-focus state and the amount of defocus detected by the first focus detection unit is less than a third threshold value, the control unit changes the control mode to the predetermined control mode according to the detected defocus direction, and
wherein the third threshold value is equal to or less than the first threshold value.

7. The automatic focus adjustment apparatus according to claim 1,
wherein the defocus information includes an amount of defocus and a defocus direction, and
wherein, in a second case in which the focus state in the second range detected by the second focus detection unit is an in-focus state and the amount of defocus detected by the first focus detection unit is equal to or greater than a second threshold value, the control unit changes the control mode to the predetermined control mode.

8. The automatic focus adjustment apparatus according to claim 7, wherein, in the second case, the control unit performs the predetermined control mode only when the focus lens is not being driven.

9. The automatic focus adjustment apparatus according to claim 7, wherein, until a second period of time elapses since the switching to the predetermined control mode, the control unit maintains the focus lens not to be driven.

10. The automatic focus adjustment apparatus according to claim 7, wherein the second threshold value is changed depending on at least one of a depth of field and an image capture mode.

11. The automatic focus adjustment apparatus according to claim 10, wherein the second threshold value is set such that the second threshold value decreases as a depth of field value decreases.

12. The automatic focus adjustment apparatus according to claim 10, wherein when a moving image is taken, the second threshold value is set to be greater than is set when a still image is taken.

13. The automatic focus adjustment apparatus according to claim 1,
wherein the defocus information includes an amount of defocus and a defocus direction, and
wherein, in a first case in which the focus state in the second range detected by the second focus detection unit is an in-focus state and the amount of defocus detected by the first focus detection unit is less than a first threshold value, the control unit changes the control mode to the predetermined control mode according to the detected defocus direction.

14. The automatic focus adjustment apparatus according to claim 13, wherein in the first case, the control unit performs the predetermined control mode only when the focus lens is being driven.

15. The automatic focus adjustment apparatus according to claim 13,
wherein, until a first period of time elapses since the switching to the predetermined control mode, the control unit limits the amount of driving the focus lens to a second driving amount less than a first driving amount set based on the amount of defocus detected by the first focus detection unit.

16. The automatic focus adjustment apparatus according to claim 15, wherein the second driving amount is set based on an amount of defocus less by a predetermined amount or ratio than the amount of defocus detected by the first focus detection unit.

17. The automatic focus adjustment apparatus according to claim 13, wherein in the first case, when the defocus direction detected by the first focus detection unit is a particular direction, the control unit switches the control mode to the predetermined control mode.

18. The automatic focus adjustment apparatus according to claim 17, wherein the particular direction is a defocus direction detected in an immediately previous focus detection by the first focus detection unit.

19. The automatic focus adjustment apparatus according to claim 17, wherein
the first focus detection unit includes a storage unit configured to store a history of the detected defocus direction, and
the control unit determines the particular direction depending on the history of the defocus direction stored in the storage unit.

20. The automatic focus adjustment apparatus according to claim 13, wherein the first threshold value is changed depending on at least one of a depth of field and an image capture mode.

21. The automatic focus adjustment apparatus according to claim 20, wherein the first threshold value is set such that the first threshold value increases as a depth of field value decreases.

22. The automatic focus adjustment apparatus according to claim 20, wherein when a moving image is taken, the first threshold value is set to be greater than is set when a still image is taken.

23. A method of controlling an automatic focus adjustment apparatus which includes an image sensor configured to generate an image signal by performing a photoelectric conversion on a light flux incident via an image pickup optical system including a focus lens, the method comprising:
performing a first focus detection process to detect defocus information by a phase difference detection;
performing a second focus detection process to detect a focus state based on the image signal;
setting on the image sensor a first range in which the defocus information is detected in the first focus detection process and a second range in which the focus state is detected in the second focus detection process; and
controlling driving the focus lens based on the defocus information detected in the first focus detection process,
wherein the second range is set such that the second range includes the first range, and
wherein, in a case where the focus state in the second range detected in the second focus detection process is in an in-focus state, a control mode is changed into a predetermined control mode in which the driving of the focus lens is limited according to the defocus information in the first range detected in the first focus detection process.

* * * * *